(12) United States Patent
Zaragoza

(10) Patent No.: US 9,996,504 B2
(45) Date of Patent: Jun. 12, 2018

(54) SYSTEM AND METHOD FOR CLASSIFYING TEXT SENTIMENT CLASSES BASED ON PAST EXAMPLES

(71) Applicant: Amazon Technologies, Inc., Seattle, WA (US)

(72) Inventor: Hugo Zaragoza, Barcelona (ES)

(73) Assignee: AMAZON TECHNOLOGIES, INC., Seattle, WA (US)

(*) Notice: Subject to any disclaimer, the term of this patent is extended or adjusted under 35 U.S.C. 154(b) by 0 days. days.

(21) Appl. No.: 14/317,477

(22) Filed: Jun. 27, 2014

(65) Prior Publication Data

US 2015/0242393 A1     Aug. 27, 2015

Related U.S. Application Data

(60) Provisional application No. 61/843,709, filed on Jul. 8, 2013.

(51) Int. Cl.
*G06F 17/20* (2006.01)
*G06F 17/21* (2006.01)
*G06F 17/27* (2006.01)

(52) U.S. Cl.
CPC .......... *G06F 17/21* (2013.01); *G06F 17/2785* (2013.01)

(58) Field of Classification Search
CPC ............... G06Q 30/02; G06Q 30/0224; G06Q 30/0201; G06Q 30/0631; G06Q 50/01; G06F 17/30705; G06F 17/30707; G06F 17/30722; G06F 17/30554; G06F 17/30648; G06F 17/30749; G06F 17/30867

USPC ...... 704/1–10, 230–231, 252, 255; 705/7.29–7.33, 26.7; 706/18, 20; 707/748–749

See application file for complete search history.

(56) References Cited

U.S. PATENT DOCUMENTS

| 7,788,087 | B2 | 8/2010 | Corston-Oliver et al. |
|---|---|---|---|
| 2008/0249764 | A1 | 10/2008 | Huang et al. |
| 2009/0125371 | A1 | 5/2009 | Neylon et al. |
| 2010/0138427 | A1* | 6/2010 | Van De Par ...... G06F 17/30743 707/748 |
| 2010/0150393 | A1 | 6/2010 | Ni et al. |
| 2011/0137906 | A1 | 6/2011 | Cai et al. |
| 2013/0018824 | A1* | 1/2013 | Ghani ............... G06N 99/005 706/12 |

OTHER PUBLICATIONS

Pang, Bo and Lillian Lee, "Opinion Mining and Sentiment Analysis," Foundations and Trends in Information Retrieval, vol. 2, Nos. 1-2, 2008, 137 pages.

* cited by examiner

*Primary Examiner* — Feng Niu
*Assistant Examiner* — Stephen M Brinich
(74) *Attorney, Agent, or Firm* — Lindauer Law, PLLC

(57) ABSTRACT

A passage sentiment classifier that can be used to assign a score that indicates the polarity and magnitude of sentiment expressed by a piece of text using information about similar passages. A passage of text may be a few words, a sentence, a paragraph or an entire document. The invention described classifies automatically passages by first looking up the most similarly classified passage in a storage system, which contains passages that have been classified manually by a human.

36 Claims, 3 Drawing Sheets

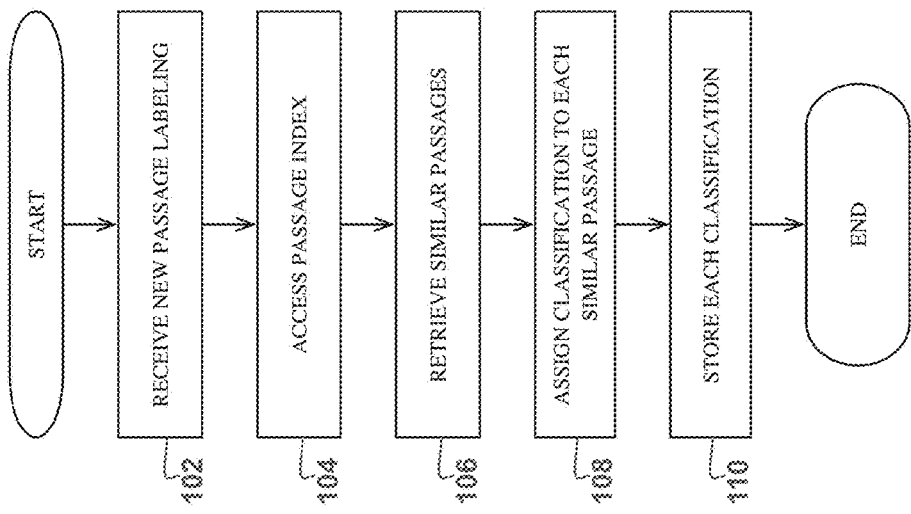

SYSTEM AND METHOD FOR CLASSIFYING TEXT SENTIMENT CLASSES BASED ON PAST EXAMPLES

CROSS-REFERENCE TO RELATED APPLICATIONS

This application arises from provisional application No. 61/843,709 filed on Jul. 8, 2013 and claims the benefit thereof.

BACKGROUND OF THE INVENTION

The present disclosure relates to natural language processing and classification of textual documents and more specifically to assigning a score that reflects the polarity and magnitude of the sentiment expressed Good automatic classification is challenging: it comes at a high cost (of speed and resources) and often leads to poor results. Human classification by an expert produces much better results, but is often too expensive and slow.

In some applications many of the passages exhibit similarities. For example in a collection of short user posts (such as Tweets or Facebook comments), an original post may lead to very many repetitions with only minor modifications. In this case it is reasonable to use an expensive method of classification (a human, or a high-accuracy automatic process) to classify one of the posts and use a fast automatic method to find all similar posts and classify them automatically, obtaining a compromise in accuracy, speed and cost.

A passage of text may be a few words, a sentence, a paragraph or an entire document. Passages of text are common in the Internet, for example as Tweets, Facebook posts, blog posts or blog comments, etc. There are many reasons to classify passages of text. For example, one may be interested in classifying passages by their topic, as spam or not spam, or by semantic properties of the sentence such as its sentiment or polarity (whether its tone is positive or negative, for example).

Sentiment classification is a method helpful when tracking the overall perception of brands, companies or products. Sentiment classification can be used on the Internet to obtain a measure of the reception of a brand or product on the Internet, for example. Business analytics applications could use sentiment classification over a plethora of textual sources, such as reviews, blogs posts, and information present in Social media online sites such as Facebook or Twitter, in order to quantify the perception of brands.

Sentiment classification pertains to assigning a class between either a discrete set of values (positive, neutral or negative) or a real valued normalized score, where the higher bound represents positive sentiment, and the lower bound negative sentiment. Typically, sentiment classifiers make use of the words in a document to classify a piece of text, in which some words are assumed to convey a particular sentiment value. In order to determine which words are indicative of a particular sentiment class or value, some pieces of text are usually classified by a human, which assigns a label to the text. Further, the label of the piece of text are propagated to the words in the text, and these labels are assigned a real valued weight, derived from the information conveyed by the labels of the whole collection of passages or documents. These weights are further computed using methods derived from statistical learning theory (machine learning).

However, the manual process of assigning the labels to the pieces of text is time consuming and expensive, as it is being dependent on human intervention.

A method to perform automatic sentiment class so is described here, whereby the invention makes use of a nearest-neighbor classifier to locate all the similar passages to a passage of known class.

Nearest neighbor search (NNS), also known as proximity search, similarity search or closest point search, is an optimization problem for finding closest points in metric spaces. The problem is: given a set S of points in a metric space M and a query point $q \in M$, find the closest point in S to q. In many cases, M is taken to be d-dimensional Euclidean space and distance is measured by Euclidean distance or Manhattan distance, but other spaces and distances can be used. For example in the case of points representing text passages one may use a string metric such as Hamming distance or Levenshtein distance.

There exist a number of methods to perform NNS on a given collection of points and a given metric. Common methods include: linear search, space partitioning, locality sensitive hashing, or methods based on compression or clustering of the points.

Opinion mining and sentiment analysis. Bo Pang and Lillian Lee. Foundations and Trends® in Information Retrieval 2(1-2), pp. 1-135, Now Publishers Inc, 2008, presents and overview of recent sentiment classification methods, with an emphasis on classification features based on combinations of words in the document.

U.S. Publication Number US 2009/0125371 A1, filing date Aug. 23, 2007 (Tyler J. Neylon et al.) describes a domain-specific sentiment classifier that can be used to score the polarity and magnitude of sentiment expressed by domain-specific documents.

U.S. Publication Number US 2010/0150393 A1, filing date Dec. 16, 2008 (Xiaochuan Ni et al.) disclose a system to classify textual data according to their sentiment using domain data.

U.S. Publication Number US 2008/0249764 A1, filing date Dec. 5, 2007 (Shen Huan et al.) describes a system that classifies text according to their sentiment, using complex features such as expressions, negation patterns, sentiment specific sections of a product review and so on.

U.S. Pat. No. 7,788,087, issue date Aug. 31, 2010 (Simon H. Corston-Oliver et al.) describes a system for identifying, extracting, clustering and analyzing sentiment-bearing text.

U.S. Publication Number US 2011/0137906 A1 describes a method for analyzing sentiment, comprising of collecting an object from a external content repository; the collected objects forming a content database and extracting a snippet related to the subject from the content database.

BRIEF SUMMARY OF THE INVENTION

A passage sentiment classifier that can be used to assign a score that indicates the polarity and magnitude of sentiment expressed by a piece of text using information about similar passages. A passage of text may be a few words, a sentence, a paragraph or an entire document. The invention described classifies automatically passages by first looking up the most similarly classified passage in a storage system, which contains passages that have been classified manually by a human.

BRIEF DESCRIPTION OF THE SEVERAL VIEWS OF THE DRAWING

FIG. 3 is a block diagram of an embodiment wherein a passage selection module receives in step 102 a new passage labeling. A textual passage is a string of text such as a paragraph, a document section, a blog post, a comment in a glob post, a micro-blog post such as a Tweet or a Facebook post. A passage labeling is obtained when a human analyst or an automatic process assigns a label L to a passage S. In step 104 the processor accesses the passage index to retrieve in step 106 the set of passages T constituted by pages that are similar to the passage S. In step 108 it assigns to each of the passages in T the class L. Finally in step 110 the new passage classifications are stored.

DETAILED DESCRIPTION OF THE INVENTION

Figure 1:
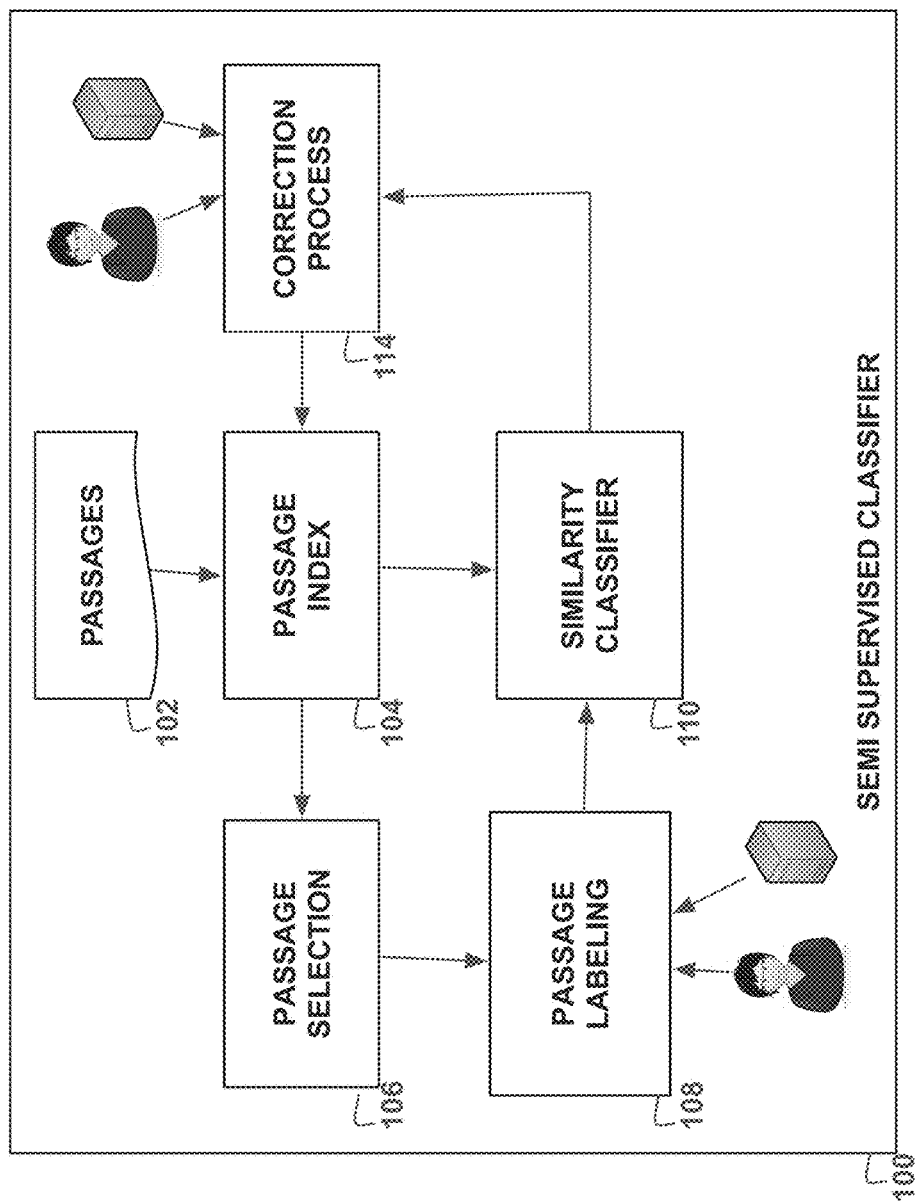
FIG. 1 is a block diagram of an embodiment wherein a passage in the passage index 104 is selected by the passage selection module component 106 (this selected passage is from now on referred to as the S passage), and the S passage is assigned a label by a human analyst or a processing system (this label is referred to as C from now on). In this embodiment a similarity classifier 110 retrieves a set of similar passages to the S passage from the passage index (these similar passages are from now on referred as the T passage set) and classifies them by assigning to each one of them the class C. In this embodiment, the correction process module 114 allows a human analyst or a processing system to correct the class assignments, before they are stored in the passage index.

FIG. 1 is a block diagram of an embodiment wherein a passage in the passage index 104 is selected by the passage selection module component 106 (this selected passage is from now on referred to as the S passage), and the S passage is assigned a label by a human analyst or a processing system (this label is referred to as C from now on). In this embodiment a similarity classifier 110 retrieves a set of similar passages to the S passage from the passage index (these similar passages are from now on referred as the T passage set) and classifies them by assigning to each one of them the class C. In this embodiment, the correction process module 114 allows a human analyst or a processing system to correct the class assignments, before they are stored in the passage index.

FIG. 3 is a block diagram of an embodiment wherein a passage selection module 106 receives in step 202 a new passage labeling. A textual passage is a string of text such as a paragraph, a document section, a blog post, a comment in a glob post, a micro-blog post such as a Tweet or a Facebook post. A passage labeling is obtained when a human analyst or an automatic process assigns a label L to a passage S. In step 204 the processor accesses the passage index to retrieve in step 206 the set of passages T constituted by pages that are similar to the passage S. In step 208 it assigns to each of the passages in T the class L. Finally in step 210 the new passage classifications are stored.

Similar passages can be determined in step 206 by comparing the passage S to each passage in the passage index 104 and computing a similarity score between each passage in the index and the passage S. In one embodiment, similarity scores are computed by preprocessing the passage S and preprocessing each passage in T. Preprocessing a passage can be done by applying a sequence of text transformation rules. Text transformation rules can remove a predetermined set of string matching patterns from the passages. For example a text transformation rule that removes the prefix "FW:" from the beginning of a passage would make all the titles of replied emails equal to the title of the original mail. As another example, removing URLs from text could be achieved with another text transformation rule.

In one embodiment similarity between preprocessed passages is computed by a string distance metrics. For example, the similarity between two passages can be computed using the Levenshtein distance, the Hamming distance, and other string distances. In another embodiment the similarity score between two passages is computed as the Euclidean distance of the feature vector of each passage. The features are derived from the passages using the tokens in the preprocessed passages. In another embodiment the features are derived form the passages using sequences of tokens in the passages. The sequences of tokens in the passages are all the fixed length subsequence of tokens in the passages, often referred to as n-grams. In this embodiment features used to represent passages as feature vectors. Feature vectors are weighted by the frequency of the feature in the passage. In another embodiment the feature vector is weighted by the TF-IDF score of the corresponding feature. The TF-IDF score is computed as the frequency of the feature multiplied by the log of the inverse document frequency of the feature, where the document frequency of the feature is defined as the number of passages containing the feature in a collection of passages.

Application programs using the methods disclosed herein may be loaded and executed on a variety of computer systems comprising a variety of hardware components. An exemplary computer system and exemplary operating environment for practicing the methods disclosed herein is described below.

Exemplary Operating Environment

Figure 2:
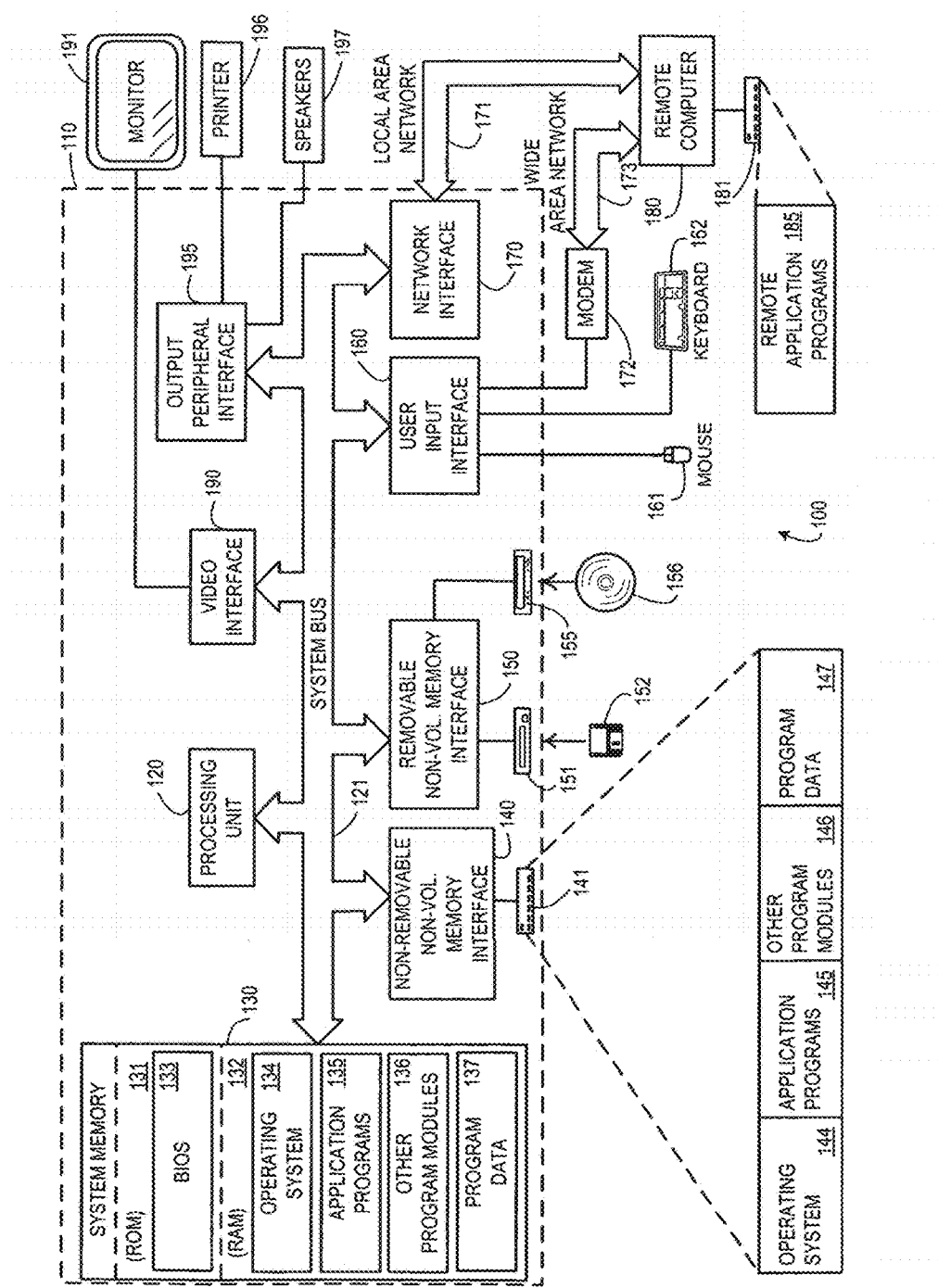
FIG. 2 is a block diagram of some of the primary components of an exemplary operating environment for implementation of the methods and processes disclosed herein.

FIG. 2 illustrates an example of a suitable computing system environment 100 on which the methods disclosed herein may be implemented. The computing system environment 100 is only one example of a suitable computing environment and is not intended to suggest any limitation as to the scope of use or functionality of the methods disclosed herein. Neither should the computing environment 100 be interpreted as having any dependency or requirement relating to any one or combination of components illustrated in the exemplary operating environment 100.

The methods disclosed herein are operational with numerous other general purpose or special purpose computing system environments or configurations. Examples of well-known computing systems, environments, and/or configurations that may be suitable for use with the methods disclosed herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The methods and processes disclosed herein may be described in the general context of computer-executable instructions, such as program modules, being executed by a computer. Generally, program modules include routines, programs, objects, components, data structures, etc. that perform particular tasks or implement particular abstract data types. The methods and processes disclosed herein may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the methods and processes disclosed herein includes a general purpose computing device in the form of a computer 110. Components of computer 110 may include, but are not limited to, a processing unit 120, a system memory 130, and a system bus 121 that couples various system components including, but not limited to, system memory 130 to processing unit 120. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media as used herein.

System memory 130 includes computer storage media in the form of volatile and/or nonvolatile memory such as read only memory (ROM) 131 and random access memory (RAM) 132. A basic input/output system 133 (BIOS) containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

Computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. Hard disk drive 141 is typically connected to system bus 121 through a non-removable memory interface such as interface 140, and magnetic disk drive 151 and optical disk drive 155 are typically connected to system bus 121 by a removable memory interface, such as interface 150.

The drives and their associated computer storage media discussed above and illustrated in FIG. 2 provide storage of computer readable instructions, data structures, program modules and other data for computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to processing unit 120 through a user input interface 160 that is coupled to system bus 121, but may be connected by other interface and bus structures, such as a parallel port, game port or a universal serial bus (USB). A monitor 191 or other type of display device is also connected to system bus 121 via an interface, such as a video interface 190. In addition to monitor 191, computer 110 may also include other peripheral output devices such as speakers 197 and printer 196, which may be connected through an output peripheral interface 195.

Computer 110 may operate in a networked environment using logical connections to one or more remote computers, such as a remote computer 180. Remote computer 180 may be a personal computer, a server, a router, a network PC, a peer device or other common network node, and typically includes many or all of the elements described above relative to computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, computer 110 is connected to LAN 171 through a network interface or adapter 170. When used in a WAN networking environment, computer 110 typically includes a modem 172 or other means for establishing communications over WAN 173, such as the Internet. Modem 172, which may be internal or external, may be connected to system bus 121 via user input interface 160, or other appropriate mechanism. In a networked environment, program modules depicted relative to computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Methods and processes disclosed herein may be implemented using one or more application programs including, but not limited to, a server system software application (e.g., WINDOWS SERVER SYSTEM™ software application), a search ranking application, and an application for generating, maintaining and storing usage data of documents within a network space (e.g., WINDOWS® SHAREPOINT® Services application), any one of which could be one of numerous application programs designated as application programs 135, application programs 145 and remote application programs 185 in exemplary system 100.

As mentioned above, those skilled in the art will appreciate that the disclosed methods of assigning a score that reflects the polarity and magnitude of the sentiment expressed may be implemented in other computer system configurations, including hand-held devices, multiprocessor systems, microprocessor-based or programmable consumer electronics, networked personal computers, minicomputers, mainframe computers, and the like. The disclosed methods of assigning a score that reflects the polarity and magnitude of the sentiment expressed may also be practiced in distributed computing environments, where tasks are performed by remote processing devices that are linked through a communications network. In a distributed computing environment, program modules may be located in both local and remote memory storage devices.

The invention claimed is:

1. A computer-implemented method for classifying sentiment expressed by passages of text comprising:
    selecting, by one or more processors, a passage of text to be classified;
    assigning, by at least one of the one or more processors, a label from one or more class assignments to the passage of text to thereby generate a labeled passage of text, wherein the label corresponds to a sentiment of the passage of text and the label enables a user device to quantify perceptions of the passage of text;
    identifying, by at least one of the one or more processors, one or more similar passages of text from a passage index that correspond to the labeled passage of text;
    determining, by at least one of the one or more processors, that at least one of the one or more similar passages of text is incorrectly identified to correspond to the labeled passage of text;
    classifying, by at least one of the one or more processors, the one or more similar passages of text identified to correspond to the labeled passage of text by adding the label;
    classifying, by at least one of the one or more processors, the at least one of the one or more similar passages of text determined to be incorrectly identified to a second label from the one or more class assignments, the second label being different than the assigned label;
    correcting, by at least one of the one or more processors, labels of the one or more similar passages of text that correspond to the labeled passage of text to have the same label;
    correcting, by at least one of the one or more processors, the label of the at least one or more similar passages of text determined to be incorrectly identified to the second label; and
    storing, by at least one of the one or more processors, in the passage index the label of the labeled passage of text, the labels of the one or more similar passages of text corrected to correspond to the labeled passage of text, and the second label of the at least one of the one or more similar passages of text determined to be incorrectly identified.

2. The computer-implemented method of claim 1, wherein identifying the one or more similar passages of text from the passage index that correspond to the labeled passage of text further comprising:
    preprocessing, by at least one of the one or more processors, the one or more similar passages of text by applying a sequence of text transformation rules.

3. The computer-implemented method of claim 1, wherein identifying the one or more similar passages of text from the passage index that correspond to the labeled passage of text further comprising:
    computing, by at least one of the one or more processors, the one or more similar passages of text from the passage index that correspond to the labeled passage of text using the nearest neighbors algorithm.

4. The computer-implemented method of claim 3, wherein computing, by the processor, the one or more similar passages of text from the passage index that correspond to the labeled passage of text further comprising:
    computing, by at least one of the one or more processors, a similarity score that includes a polarity score and a magnitude score between the one or more similar passages of text and the labeled passage of text using a distance metric based on a set of features derived from the one or more similar passages of text.

5. The computer-implemented method of claim 4, further comprising:
    computing, by at least one of the one or more processors, features derived from the one or more similar passages of text based on using tokens in the one or more similar passages of text.

6. The method of claim 4, further comprising:
    computing, by at least one of the one or more processors, features derived from the one or more similar passages of text based on using sequences of tokens in the one or more similar passages of text.

7. The method of claim 2, wherein the text transformation rules comprise one or more of:
    removing, by at least one of the one or more processors, a predetermined set of strings matching patterns at a beginning of the passage of text; or
    removing, by the processor, a predetermined set of string matching patterns at an end of the passage of text.

8. The method of claim 2, wherein the text transformation rules comprise one or more of:
    rewriting, by at least one of the one or more processors, a predetermined set of strings rewriting patterns at a beginning of the passage of text; or
    rewriting, by at least one of the one or more processors, a predetermined set of strings rewriting patterns at an end of the passage of text.

9. The method of claim 4, wherein using the distance metric comprises:

determining, by at least one of the one or more processors, a vector of feature frequencies for the one or more similar passages of text and the labeled passage of text; and computing, by at least one of the one or more processors, the similarity score by determining a Euclidean distance between the determined vectors.

10. The method of claim 9, further comprising:
weighting, by at least one of the one or more processors, the vector of feature frequencies by a TF-IDF score of corresponding features.

11. The method of claim 3, wherein the nearest neighbors algorithm comprises:
computing, by at least one of the one or more processors, a similarity score between the one or more similar passages of text that correspond to the labeled passage of text by using string metric distances between the one or more similar passages of text and the labeled passage of text.

12. The method of claim 1, wherein classifying the one or more similar passages of text identified to correspond to the labeled passage of text, further comprising:
classifying, by at least one of the one or more processors, the one or more similar passages of text that correspond to the labeled passage of text with a class assignment equal to the labeled passage of text.

13. A system for constructing a sentiment classifier comprising:
a selection module configured to select a passage to be classified;
a retrieval module configured to retrieve passages that correspond to a labeled passage;
a classification module configured to label passages that correspond to the labeled passage, wherein the label corresponds to a sentiment of the passage and the label enables a user device to quantify perceptions of the passage;
a correction module configured to correct sentiment classifiers incorrectly assigned to the passages that correspond to the labeled passage; and
a storage module configured to store the sentiment classifier.

14. The system of claim 13, wherein the selection module is further configured to:
preprocess the passages by applying a sequence of text transformation rules.

15. The system of claim 13, wherein the selection module is further configured to:
determine the passages that correspond to the labeled passage by using a nearest neighbors algorithm.

16. The system of claim 15, wherein the nearest neighbors algorithm comprises:
computing a similarity score that includes a polarity score and a magnitude score between passages that correspond to the labeled passage by using a distance metric based on a set of features derived from the passages.

17. The system of claim 16, wherein the features derived from the passages are based on tokens within the passages.

18. The system of claim 16, wherein the features derived from the passages are based on a sequence of tokens within the passages.

19. The system of claim 13, further comprising a preprocessing module configured to:
remove a predetermined set of strings matching patterns at a beginning of the passage; and
remove a predetermined set of string matching patterns at an end of the passage.

20. The system of claim 13, further comprising a preprocessing module configured to:
rewrite a predetermined set of strings rewriting patterns at a beginning of the passage; and
rewrite a predetermined set of string rewriting patterns at an end of the passage.

21. The system of claim 13, further comprising a computing module configured to:
represent the passages as a vector of feature frequencies; and
compute a similarity score for each of the vector of feature frequencies by a Euclidean distance.

22. The system of claim 21, wherein the computing module is further configured to:
weight each of the vector of feature frequencies by a TF-IDF score of corresponding features.

23. The system of claim 13, further comprising a computing module configured to:
compute a similarity score between the passages that correspond to the labeled passage by using a string edit distance between each of the passages that correspond to the labeled passage.

24. The system of claim 13, wherein the classification module is further configured to:
classify the passages that correspond to the labeled passage with the sentiment classifier equal to the label assigned to the labeled passage.

25. A computing system containing at least one application module usable on the computing system, wherein the at least one application module comprises application code for constructing a sentiment classifier for classifying sentiment expressed by passages, the computer-executable code comprising:
a selection module configured to select a passage to be classified;
a retrieval module configured to retrieve passages that correspond to the selected passage, wherein the selected passage is assigned a label;
a classification module configured to label the passages that have been identified to correspond to the labeled passage;
a correction module configured to correct classes incorrectly assigned to the passages that have been identified to correspond to the labeled passage; and
a storage module configured to store the corrected classes of the passages that have been identified to correspond to the labeled passage.

26. The computing system of claim 25, wherein the selection module is further configured to:
preprocess the passages by applying a sequence of text transformation rules.

27. The computing system of claim 25, wherein the selection module is further configured to:
determine the passages that correspond to the labeled passage by using a nearest neighbors algorithm.

28. The computing system of claim 27, wherein the nearest neighbors algorithm comprises:
computing a similarity score that includes a polarity score and a magnitude score between passages that correspond to the labeled passage by using a distance metric based on a set of features derived from the passages.

29. The computing system of claim 28, wherein the features derived from the passages are based on tokens within the passages.

30. The computing system of claim 28, wherein the features derived from the passages are based on a sequence of tokens within the passages.

31. The computing system of claim 25, further comprising a preprocessing module configured to:
   remove a predetermined set of strings matching patterns at a beginning of the passage; and
   remove by the processor, a predetermined set of string matching patterns at an end of the passage.

32. The computing system of claim 25, further comprising a preprocessing module configured to:
   rewrite a predetermined set of strings rewriting patterns at a beginning of the passage; and
   rewrite a predetermined set of string rewriting patterns at an end of the passage.

33. The computing system of claim 25, further comprising a computing module configured to:
   represent the passages as a vector of feature frequencies; and
   compute a similarity score for each of the vector of feature frequencies by a Euclidean distance.

34. The computing system of claim 33, wherein the computing module is further configured to:
   weight each of the vector of feature frequencies by a TF-IDF score of corresponding features.

35. The computing system of claim 25, further comprising a computing module configured to:
   compute a similarity score between the passages that correspond to the labeled passage by using a string edit distance between each of the passages that correspond to the labeled passage.

36. The computing system of claim 25, wherein the classification module is further configured to:
   classify the passages that correspond to the labeled passage with a class equal to the label assigned to the labeled passage.

\* \* \* \* \*